(12) United States Patent
Wiedenhoefer et al.

(10) Patent No.: US 10,364,685 B2
(45) Date of Patent: Jul. 30, 2019

(54) IMPINGEMENT SYSTEM FOR AN AIRFOIL

(71) Applicant: General Electric Company, Schenectady, NY (US)

(72) Inventors: James Fredric Wiedenhoefer, Clifton Park, NY (US); Brian Gene Brzek, Clifton Park, NY (US)

(73) Assignee: Gneral Electric Company, Schenetady, NY (US)

( * ) Notice: Subject to any disclaimer, the term of this patent is extended or adjusted under 35 U.S.C. 154(b) by 400 days.

(21) Appl. No.: 15/236,062

(22) Filed: Aug. 12, 2016

(65) Prior Publication Data

US 2018/0045061 A1 Feb. 15, 2018

(51) Int. Cl.
*F01D 5/18* (2006.01)
*F01D 9/06* (2006.01)
(Continued)

(52) U.S. Cl.
CPC .............. *F01D 5/189* (2013.01); *F01D 9/065* (2013.01); *F02C 3/04* (2013.01); *F02C 7/12* (2013.01);
(Continued)

(58) Field of Classification Search
CPC .......... F01D 5/186; F01D 5/188; F01D 25/12; F01D 9/02; F01D 9/065; F01D 5/189;
(Continued)

(56) References Cited

U.S. PATENT DOCUMENTS 3,191,908 A * 6/1965 James ..................... F01D 5/187
416/96 R
3,606,573 A 9/1971 Emmerson et al.
(Continued)

FOREIGN PATENT DOCUMENTS

DE 2703815 A1 * 2/1979 ............. F01D 5/188
EP 2489837 A1 * 8/2012 ............. F01D 5/188
EP 2607624 A1 6/2013

OTHER PUBLICATIONS

Carcassi et al., "Heat Transfer and Pressure Drop Evaluation in Thin Wedge-Shaped Trailing Edge", Heat Transfer, pp. 111-122, 2003.
(Continued)

*Primary Examiner* — J. Todd Newton
(74) *Attorney, Agent, or Firm* — Armstrong Teasdale LLP

(57) ABSTRACT

An airfoil includes an exterior wall, a trailing edge pin bank, and an impingement system. The exterior wall includes an inner surface and an outer surface and defines a first interior space. The impingement system is disposed within the first interior space and is configured to channel a coolant stream to the exterior wall. The coolant stream has a velocity. The impingement system includes an interior wall which defines a second interior space and a plurality of impingement holes having an impingement hole density. The impingement system also includes dividing walls extending from the interior wall to the exterior wall. The interior wall, exterior wall, and dividing walls define a first and second zone. A first dividing wall is coupled to the trailing edge pin bank and separates the first and second zones. The impingement hole density configured to separately meter flow to the first and second zones.

17 Claims, 4 Drawing Sheets

(51) Int. Cl.
*F02C 3/04* (2006.01)
*F02C 7/12* (2006.01)

(52) U.S. Cl.
CPC ............. *F05D 2220/3212* (2013.01); *F05D 2260/201* (2013.01); *Y02T 50/676* (2013.01)

(58) Field of Classification Search
CPC .... F02C 3/03; F05D 2220/32; F05D 2240/35; F05D 2220/3212; F05D 2260/202; F05D 2240/304; F05D 2240/122; F05D 2260/201
USPC .......................................................... 60/806
See application file for complete search history.

(56) References Cited

U.S. PATENT DOCUMENTS

| | | | |
|---|---|---|---|
| 4,056,332 A * | 11/1977 | Meloni | F01D 5/188 415/115 |
| 4,063,851 A | 12/1977 | Weldon | |
| 4,297,077 A * | 10/1981 | Durgin | F01D 5/189 416/97 R |
| 4,403,917 A * | 9/1983 | Laffitte | F01D 5/188 415/115 |
| 4,407,632 A * | 10/1983 | Liang | F01D 5/187 415/115 |
| 4,515,523 A * | 5/1985 | North | F01D 5/187 415/115 |
| 4,697,985 A * | 10/1987 | Suzuki | F01D 5/189 415/115 |
| 5,100,293 A * | 3/1992 | Anzai | F01D 5/186 416/96 A |
| 5,193,980 A | 3/1993 | Kaincz et al. | |
| 5,591,002 A | 1/1997 | Cunha et al. | |
| 5,702,232 A * | 12/1997 | Moore | F01D 5/186 416/95 |
| 5,743,708 A | 4/1998 | Cunha et al. | |
| 6,000,908 A | 12/1999 | Bunker | |
| 6,206,638 B1 | 3/2001 | Glynn et al. | |
| 6,238,183 B1 * | 5/2001 | Williamson | F01D 5/189 416/96 A |
| 6,318,963 B1 * | 11/2001 | Emery | F01D 5/186 416/96 A |
| 6,506,013 B1 | 1/2003 | Burdgick et al. | |
| 6,530,745 B2 * | 3/2003 | Ciani | F01D 5/186 415/115 |
| 6,726,444 B2 | 4/2004 | Zhao et al. | |
| 6,974,308 B2 | 12/2005 | Halfmann et al. | |
| RE39,479 E * | 1/2007 | Tressler | F01D 5/189 415/115 |
| 7,497,655 B1 * | 3/2009 | Liang | F01D 5/189 415/1 |
| 7,556,476 B1 * | 7/2009 | Liang | F01D 5/188 415/115 |
| 7,568,882 B2 | 8/2009 | Brittingham et al. | |
| 7,625,180 B1 * | 12/2009 | Liang | F01D 5/186 29/889.2 |
| 7,690,894 B1 | 4/2010 | Liang | |
| 7,819,169 B2 | 10/2010 | Pietraszkiewicz et al. | |
| 7,871,246 B2 | 1/2011 | Liang | |
| 8,043,057 B1 | 10/2011 | Liang | |
| 8,043,060 B1 | 10/2011 | Liang | |
| 8,057,183 B1 * | 11/2011 | Liang | F01D 5/187 416/96 A |
| 8,096,770 B2 * | 1/2012 | Liang | F01D 5/186 415/115 |
| 8,162,609 B1 | 4/2012 | Liang | |
| 8,182,203 B2 | 5/2012 | Hada et al. | |
| 8,231,329 B2 * | 7/2012 | Benjamin | F01D 5/188 415/115 |
| 8,562,295 B1 | 10/2013 | Liang | |
| 9,011,077 B2 * | 4/2015 | Vitt | F01D 5/186 415/115 |
| 9,011,079 B2 | 4/2015 | Coign et al. | |
| 9,169,733 B2 | 10/2015 | Kerber et al. | |
| 9,267,381 B2 | 2/2016 | Morris et al. | |
| 9,297,261 B2 | 3/2016 | Otero | |
| 9,863,255 B2 * | 1/2018 | Mugglestone | F01D 5/189 |
| 2004/0009066 A1 * | 1/2004 | Soechting | F01D 5/186 416/96 R |
| 2005/0232769 A1 | 10/2005 | Lee et al. | |
| 2007/0243065 A1 * | 10/2007 | Devore | F01D 5/189 416/97 R |
| 2007/0258814 A1 | 11/2007 | Metrisin et al. | |
| 2010/0221121 A1 | 9/2010 | Liang | |
| 2010/0247290 A1 * | 9/2010 | Hada | F01D 5/189 415/115 |
| 2014/0093379 A1 * | 4/2014 | Tibbott | F01D 5/189 416/224 |
| 2014/0093390 A1 * | 4/2014 | Pointon | F01D 5/186 416/97 R |
| 2014/0147287 A1 * | 5/2014 | Xu | F01D 5/186 416/96 R |
| 2014/0219788 A1 | 8/2014 | Nilsson | |
| 2015/0147158 A1 | 5/2015 | Wang et al. | |
| 2015/0345397 A1 * | 12/2015 | Bunker | F02C 7/18 416/95 |
| 2017/0030199 A1 * | 2/2017 | Barker | F01D 5/189 |
| 2017/0101932 A1 * | 4/2017 | Stover | F01D 5/189 |
| 2017/0175578 A1 * | 6/2017 | Propheter-Hinckley | F01D 9/02 |
| 2018/0045056 A1 * | 2/2018 | Wiedenhoefer | F01D 5/186 |

OTHER PUBLICATIONS

Bunker et al., "In-Wall Network (Mesh) Cooling Augmentation of Gas Turbine Airfoils", Heat Transfer, pp. 1007-1018, 2004.
Robert F Bergholz, "Preliminary Design Optimization of Impingement Cooled Turbine Airfoils", Heat Transfer, vol. 4, pp. 675-689, Jun. 9-13, 2008.
Terzis et al., "Detailed Heat Transfer Distributions of Narrow Impingement Channels for Cast-In Turbine Airfoils", Journal of Turbomachinery, vol. 136, Issue: 9, pp. 9, Jun. 3, 2014.

* cited by examiner

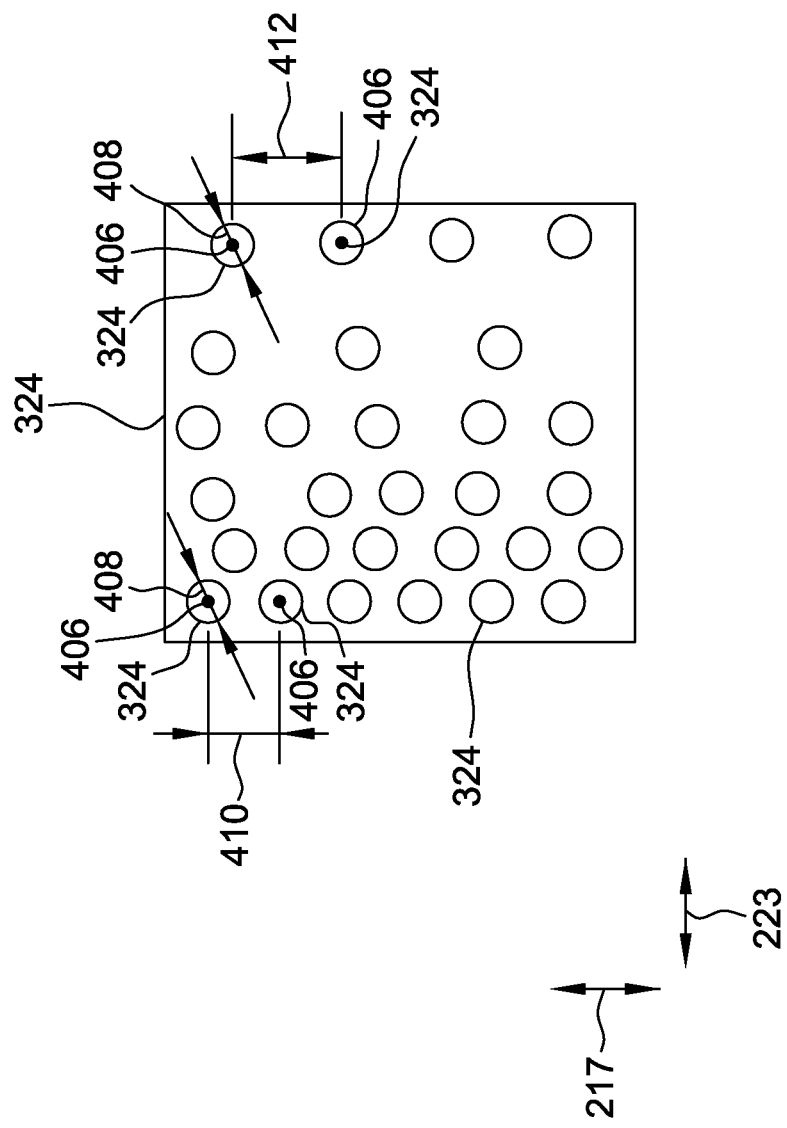

IMPINGEMENT SYSTEM FOR AN AIRFOIL

BACKGROUND

The field of the disclosure relates generally to turbomachinery and, more specifically, to systems for removing heat from turbine components.

In at least some known gas turbine engines, air is pressurized in a compressor and mixed with fuel in a combustor for generating a stream of high-temperature combustion gases. Energy is extracted from the gas stream in a turbine which powers a mechanical load. During operation of the gas turbine engine, various hot gas path components are subjected to the high-temperature gas stream, which can induce wear in the hot gas path components. Generally, higher temperature gases increase performance, efficiency, and power output of the gas turbine engine. Thus, at least some known hot gas path components are cooled to facilitate the gas turbine engine to operate with the increased high-temperature combustion gas streams.

Some known hot gas path components include an airfoil with a cooling system, wherein air, typically bleed air extracted from the compressor, is forced through internal cooling passages defined within the airfoil. The air is then discharged through cooling holes or passages located at an outer surface of the airfoil to transfer heat away from the hot gas path component. This forced air-cooling facilitates the hot gas path components functioning in the high-temperature gas stream. At least some known cooling systems increase a sidewall thickness of the airfoil to increase cooling air flow velocity through the trailing edge to facilitate heat transfer therefrom. However, increasing the sidewall thickness of the airfoil also increases thermal resistance of the surfaces to be cooled. At least some other known cooling systems increase the cooling air flow velocity by extracting additional bleed air from the compressor. However, extracting additional bleed air reduces gas turbine engine efficiency.

BRIEF DESCRIPTION

In one aspect, an airfoil is provided. The airfoil includes an exterior wall, a root portion, a tip portion, a trailing edge pin bank, and an impingement system. The exterior wall includes an inner surface, an outer surface, and a plurality of exterior wall regions and defines a first interior space. The exterior wall also includes a pressure sidewall and a suction sidewall coupled to the pressure sidewall. The suction sidewall and the pressure sidewall define a leading edge and a trailing edge opposite the leading edge. The tip portion is opposite the root portion. The trailing edge pin bank is disposed within the first interior space. The impingement system is disposed within the first interior space and is configured to channel a coolant stream to the exterior wall. The impingement system includes an interior wall substantially parallel to the exterior wall. The interior wall defines a second interior space and a plurality of impingement holes configured to channel a flow of coolant from the second interior space to the first interior space. The interior wall having an impingement hole density having a varying hole density pattern. The impingement system also includes a plurality of dividing walls extending from the interior wall to the exterior wall. The interior wall, the exterior wall, and the plurality of dividing walls define a first zone and a second zone. The plurality of dividing walls includes a first dividing wall coupled to the trailing edge pin bank. The first dividing wall separates the first zone from the second zone. The impingement hole density configured to separately meter flow to the first and second zones.

In another aspect, a system for removing heat from an airfoil is provided. The airfoil includes a trailing edge pin bank and an exterior wall including an an inner surface, an outer surface, and a plurality of exterior wall regions. The exterior wall defines a first interior space and includes a pressure sidewall and a suction sidewall coupled to the pressure sidewall. The suction sidewall and the pressure sidewall define a leading edge and a trailing edge opposite the leading edge. The airfoil further includes a root portion and a tip portion opposite the root portion. The system for removing heat from an airfoil includes an impingement system disposed within the first interior space. The impingement system is configured to channel a coolant stream to the exterior wall. The impingement system includes an interior wall substantially parallel to the exterior wall. The interior wall defines a second interior space and a plurality of impingement holes configured to channel a flow of coolant from the second interior space to the first interior space. The interior wall having an impingement hole density having a varying hole density pattern. The impingement system also includes a plurality of dividing walls extending from the interior wall to the exterior wall. The interior wall, the exterior wall, and the plurality of dividing walls define a first zone and a second zone. The plurality of dividing walls includes a first dividing wall coupled to the trailing edge pin bank. The first dividing wall separates the first zone from the second zone. The impingement hole density configured to separately meter flow to the first and second zones.

In still another aspect, a gas turbine system is provided. The gas turbine system includes a compressor section, a combustion section, and a turbine section. The combustion system is coupled in flow communication with the compressor section. The turbine section is coupled in flow communication with the combustion system. The turbine section includes an airfoil including an exterior wall, a root portion, a tip portion, a trailing edge pin bank, and an impingement system. The exterior wall includes an inner surface, an outer surface, and a plurality of exterior wall regions and defines a first interior space. The exterior wall also includes a pressure sidewall and a suction sidewall coupled to the pressure sidewall. The suction sidewall and the pressure sidewall define a leading edge and a trailing edge opposite the leading edge. The tip portion is opposite the root portion. The trailing edge pin bank is disposed within the first interior space. The impingement system is disposed within the first interior space and is configured to channel a coolant stream to the exterior wall. The impingement system includes an interior wall substantially parallel to the exterior wall. The interior wall defines a second interior space and a plurality of impingement holes configured to channel a flow of coolant from the second interior space to the first interior space. The interior wall having an impingement hole density having a varying hole density pattern. The impingement system also includes a plurality of dividing walls extending from the interior wall to the exterior wall. The interior wall, the exterior wall, and the plurality of dividing walls define a first zone and a second zone. The plurality of dividing walls includes a first dividing wall coupled to the trailing edge pin bank. The first dividing wall separates the first zone from the second zone. The impingement hole density configured to separately meter flow to the first and second zones.

DRAWINGS

These and other features, aspects, and advantages of the present disclosure will become better understood when the following detailed description is read with reference to the accompanying drawings in which like characters represent like parts throughout the drawings, wherein:

FIG. 4 is a sectional view of interior wall as illustrated in FIG. 3.

Figure 1:
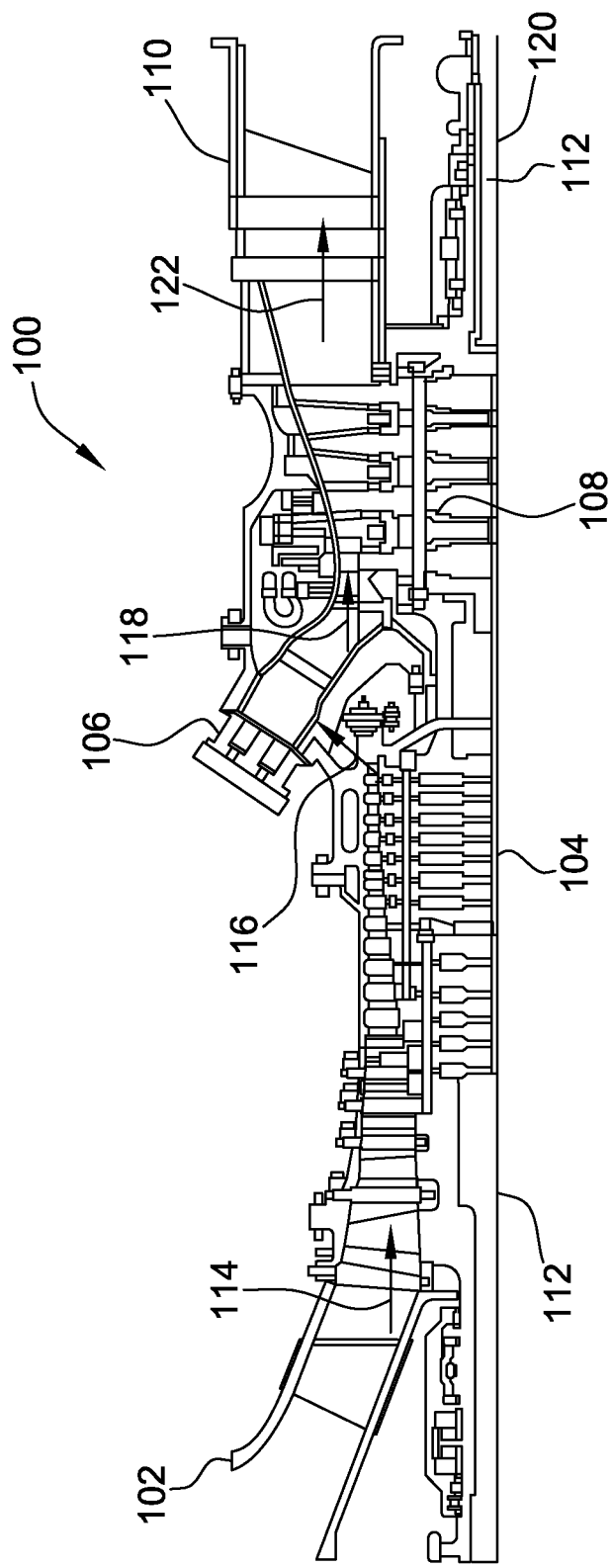
FIG. 1 is a schematic view if an exemplary rotor machine, i.e., a gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending accurately about the longitudinal axis of the gas turbine engine.

Embodiments of the present disclosure relate to systems that remove heat from gas turbine components. Specifically, in the exemplary embodiment, the gas turbine component includes an airfoil that is provided with an impingement system defined within an exterior wall of an airfoil body. The impingement system and the exterior wall define a post-impingement space therebetween. A plurality of dividers extend from the impingement system to the exterior wall each of which compartmentalize the post-impingement space into a plurality of post-impingement zones. The interior wall further defines a plurality of impingement holes which channel a flow of coolant into the post-impingement zones. The airfoil also includes a trailing edge which includes a cooling channel defined by a pin bank. During operation of the gas turbine engine, different regions of the airfoil body may by exposed to different temperatures and flows of a hot fluid depending on the arrangement of the airfoil body within the gas turbine engine. As such, different regions of the airfoil body may experience different exterior wall boundary conditions and have different, local requirements for removing heat from these disparate regions. The arrangement of the exterior wall, impingement system, dividing walls, post-impingement zones, divider, and pin banks within the airfoil body facilitates tuning a velocity, pressure drop, Reynolds Number, and heat transfer coefficient of a coolant stream that is channeled along the inner surface of the exterior wall to remove heat from the airfoil and maintain a consistent and uniform temperature of the airfoil. Tuning the coolant stream to the local heat removal requirements of the airfoil body decreases bleed air extracted from a compressor for the coolant stream channeled through the impingement system, while increasing the coolant stream efficiency within a component region that is traditionally difficult to cool. Gas turbine engine efficiency is increased because less bleed air is extracted for use as the coolant stream.

FIG. 1 is a schematic view of a rotary machine 100, i.e., a turbomachine, and more specifically, a turbine engine. In the exemplary embodiment, turbine engine 100 is a gas turbine engine. Alternatively, turbine engine 100 is any other turbine engine and/or rotary machine, including, and without limitation, a steam turbine engine, an aircraft engine, a wind turbine, and a compressor. In the exemplary embodiment, gas turbine engine 100 includes an air intake section 102, and a compressor section 104 that is coupled downstream from, and in flow communication with, intake section 102. A combustor section 106 is coupled downstream from, and in flow communication with, compressor section 104, and a turbine section 108 is coupled downstream from, and in flow communication with combustion section 106. Downstream from turbine section 108 is an exhaust section 110. Moreover, in the exemplary embodiment, turbine section 108 is rotatably coupled to compressor section 104 through a rotor assembly 112.

In operation, air intake section 102 channels air 114 towards compressor section 104. Compressor section 104 compresses inlet air 114 to higher pressures prior to discharging compressed air 116 towards combustor section 106. Compressed air 116 is channeled to combustor section 106 where it is mixed with fuel (not shown) and burned to generate high temperature combustion gases 118. Combustion gases 118 are channeled downstream towards turbine section 108, wherein after impinging turbine blades (not shown) thermal energy is converted to mechanical rotational energy that is used to drive rotor assembly 112 about a longitudinal axis 120. Often, combustor section 106 and turbine section 108 are referred to as a hot gas section of turbine engine 100. Exhaust gases 122 then discharge through exhaust section 110 to ambient atmosphere.

Figure 2:
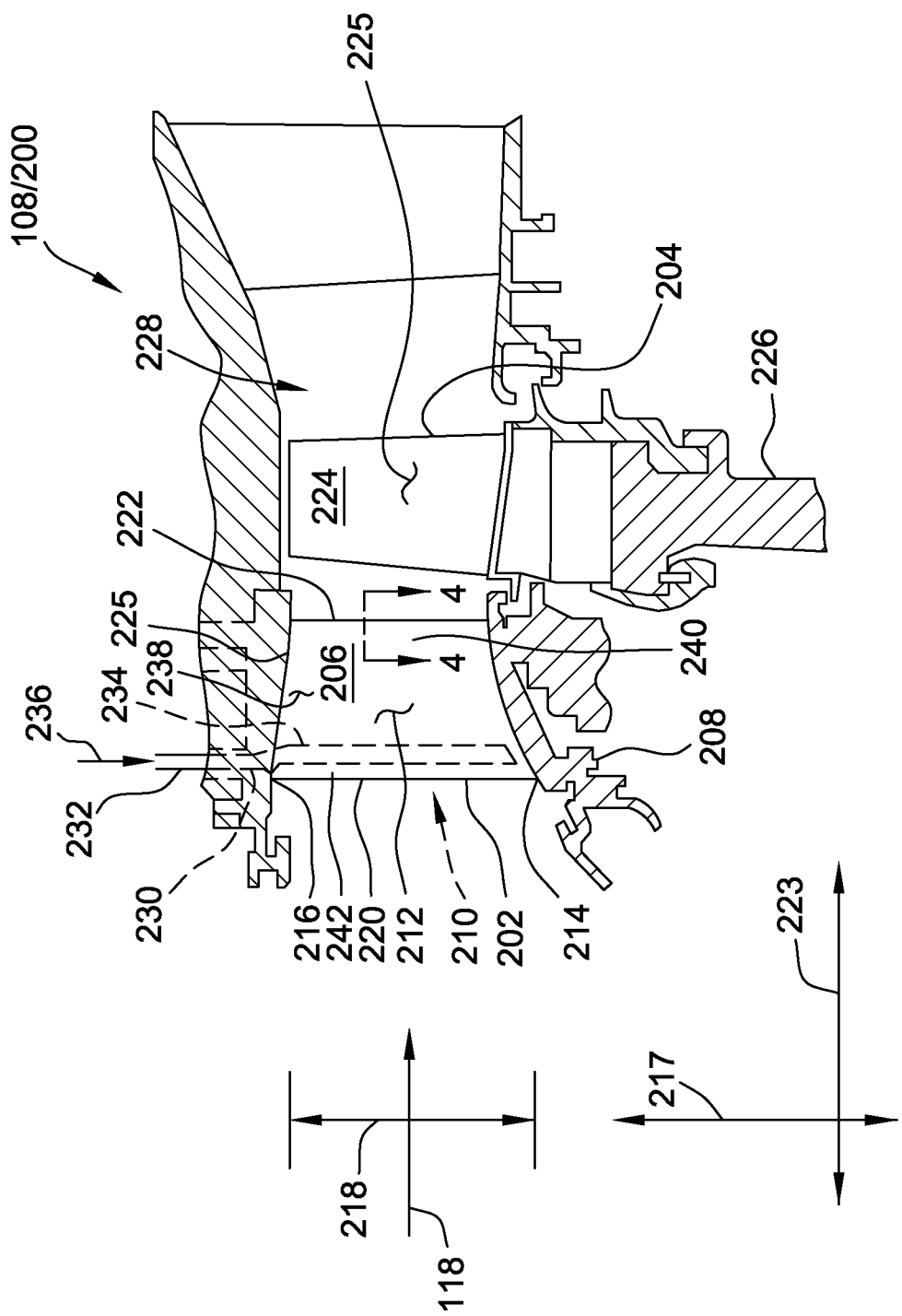
FIG. 2 is an enlarged schematic view of an exemplary first turbine stage of the gas turbine engine shown in FIG. 1.

FIG. 2 is an enlarged schematic view of a first turbine stage 200 of turbine engine 100 (shown in FIG. 1). In the exemplary embodiment, turbine section 108 includes a plurality of stator vanes 202 circumferentially spaced around longitudinal axis 120 (shown in FIG. 1) and a plurality of turbine blades 204 also circumferentially spaced around longitudinal axis 120. A row of stator vanes 202 and a row of turbine blades 204 form a turbine stage, for example first turbine stage 200, that is the first turbine stage downstream of combustor section 106 (shown in FIG. 1). Although a single turbine stage 200 is illustrated in FIG. 2, turbine section 108 may include any number of axially spaced turbine stages.

In the exemplary embodiment, stator vane 202 includes an airfoil 206 that is coupled to a turbine casing 208. Airfoil 206 includes a pressure sidewall 210 coupled to an opposite suction sidewall 212. Pressure sidewall 210 and suction sidewall 212 extend from a root 214 to an opposite tip 216 that defines a radial direction 217 such that airfoil 206 has a radial length 218 which extends in radial direction 217. Pressure sidewall 210 and suction sidewall 212 also define a leading edge 220 and an opposing trailing edge 222. Leading edge 220 and trailing edge 222 define a longitudinal direction 223. Additionally, turbine blade 204 includes an airfoil 224 coupled to rotor assembly 112 via a disk 226. Each airfoil 206 and 224 is coated with a layer 225 of thermal bond coat (TBC). TBC is formed on each airfoil 206 and 224 for further protection of high temperature combustion gases 118. Each airfoil 206 and 224 includes a first target impingement surface 238, a second target impingement surface 240, and a third target impingement surface 242.

During turbine engine 100 operation, stator vane 202 and turbine blade 204 are positioned within a hot gas flow path 228 of turbine casing 208, such that a flow of high temperature combustion gases 118 is channeled therethrough, exposing outer surfaces of stator vane airfoil 206 and turbine blade airfoil 224 to high temperatures and potential corresponding thermal stresses and/or thermal degradation. To at least partially address such thermal exposure, stator vane airfoil 206 and/or any other hot gas section component includes an impingement system 230. Impingement system 230 includes a cooling supply passage 232, defined in turbine casing 208, coupled in flow communication with at least one cooling passage 234 defined within stator vane airfoil 206. A stream of coolant fluid 236 is channeled through impingement system 230 via a coolant stream source (not shown) to facilitate the removing heat from airfoil 206 and maintaining a consistent and uniform temperature gradient of airfoil 206 to increase component efficiency. In the exemplary embodiment, coolant fluid 236 includes pressurized bleed air from compressor section 104 (shown in FIG. 1). Although air is specifically described, in alternative embodiments a fluid other than air may be used to cool components exposed to combustion gases 118. The term fluid as used herein includes any medium or material that flows, including, but not limited to, gas, steam, and air.

Figure 3:
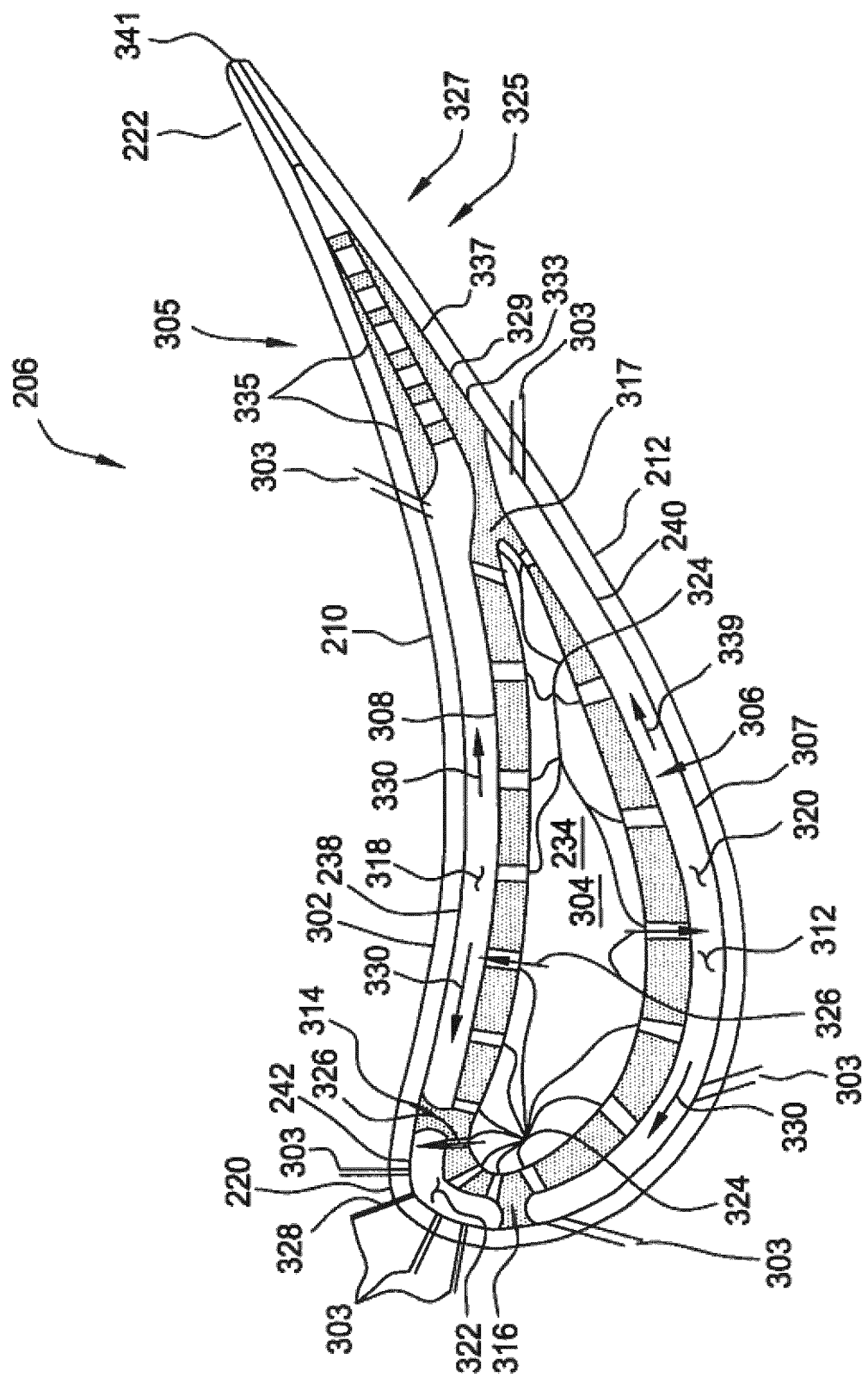
FIG. 3 is a cross-sectional view of an exemplary airfoil shown in FIG. 2.

FIG. 3 is a cross-sectional view of an exemplary stator vane airfoil 206 illustrated in FIG. 2. In the exemplary embodiment, stator vane airfoil 206 includes an exterior wall 302 which includes pressure sidewall 210 coupled to suction sidewall 212 at leading edge 220 and trailing edge 222. Exterior wall 302 defines first interior space 304, which includes the entire interior volume of stator vane airfoil 206. Exterior wall 302 further defines a plurality of film holes 303 configured to channel a flow of coolant out of stator vane airfoil 206 from first interior space 304. Stator vane airfoil 206 also includes a trailing edge cooling system 305 disposed within first interior space 304 proximate to trailing edge 222. Exterior wall 302 includes an inner surface 307, which includes first target impingement surface 238, second target impingement surface 240, and third target impingement surface 242.

An airfoil impingement system 306 is disposed within first interior space 304. Airfoil impingement system 306 includes an interior wall 308 spaced apart from and substantially parallel to exterior wall 302. Interior wall 308 defines cooling passage 234 with first interior space 304. Exterior wall 302 and interior wall 308 define a post-impingement space 312 between exterior wall 302 and interior wall 308. In the exemplary embodiment, interior wall 308, cooling passage 234, and post-impingement space 312 extend along radial length 218 from root 214 to tip 216. In another embodiment, interior wall 308, cooling passage 234, and post-impingement space 312 extend in radial direction 217 for a length shorter than radial length 218. Interior wall 308, cooling passage 234, and post-impingement space 312 may extend in radial direction 217 for any length between root 214 and tip 216 which enables airfoil impingement system 306 to operate as described herein.

Airfoil impingement system 306 also includes a plurality of dividing walls 314, 316, and 317 extending from interior wall 308 to exterior wall 302. In the exemplary embodiment, plurality of dividing walls 314, 316, and 317 includes first dividing wall 314, second dividing wall 316, and third dividing wall 317. Airfoil impingement system 306 is not limited to only three dividing walls as shown in FIG. 3. In another embodiment, airfoil impingement system 306 may include one, two, four, or more than four dividing walls. Airfoil impingement system 306 may include any number of dividing walls which enables airfoil impingement system 306 to operate as described herein.

Dividing walls 314, 316, and 317 compartmentalize post-impingement space 312 into a plurality of post-impingement zones 318, 320, and 322. In the exemplary embodiment, plurality of post-impingement zones 318, 320, and 322 includes first post-impingement zone or pressure side impingement zone 318, second post-impingement zone or suction side impingement zone 320, and third post-impingement zone or leading edge impingement zone 322. Airfoil impingement system 306 is not limited to only three post-impingement zones as shown in FIG. 3. In another embodiment, airfoil impingement system 306 may include one, two, four, or more than four post-impingement zones. Airfoil impingement system 306 may include any number of post-impingement zones which enables airfoil impingement system 306 to operate as described herein. In the exemplary embodiment, dividing walls 314, 316, and 317 and post-impingement zones 318, 320, and 322 extend along radial length 218 from root 214 to tip 216. In another embodiment, dividing walls 314, 316, and 317 and post-impingement zones 318, 320, and 322 extend in radial direction 217 for a length shorter than radial length 218 and shorter than the length interior wall 308, cooling passage 234, and post-impingement space 312 extend in radial direction 217. Dividing walls 314, 316, and 317 and post-impingement zones 318, 320, and 322 may extend in radial direction 217 for any length between root 214 and tip 216 which enables airfoil impingement system 306 to operate as described herein.

Pressure side impingement zone 318 is defined by first target impingement surface 238, interior wall 308, first dividing wall 314, and trailing edge cooling system 305. Suction side impingement zone 320 is defined by second target impingement surface 240, interior wall 308, second dividing wall 316, and third dividing wall 317. Leading edge impingement zone 322 is defined by third target impingement surface 242, interior wall 308, first dividing wall 314, and second dividing wall 316. Pressure side impingement zone 318, suction side impingement zone 320, and leading edge impingement zone 322 are not in flow communication with each other.

Interior wall 308 further defines a plurality of impingement holes 324 configured to channel a flow of coolant into post-impingement space 312 from cooling passage 234. In the exemplary embodiment, impingement holes 324 are cylindrical channels through interior wall 308. However, impingement holes 324 may include any shape which enables airfoil impingement system 306 to operate a described herein. Additionally, airfoil impingement system 306 may include any number of impingement holes which enables airfoil impingement system 306 to operate as described herein. The diameter of impingement holes 324 is one of the primary parameters, along with pressure of a coolant, which determines the flowrate of the coolant through impingement holes 324. In the exemplary embodiment, all impingement holes 324 have the same diameter. However, airfoil impingement system 306 may include impingement holes 324 with different diameters.

Trailing edge 222 includes trailing edge cooling system 305 which is included within the overall airfoil impingement system 230 described and referenced in FIG. 2. Trailing edge cooling system 305 includes a cooling channel 325 positioned between pressure sidewall 210 and suction sidewall 212. Cooling channel 325 includes a pin bank 327 which includes a plurality of support projections 329, also referenced as pins, which extend between a pressure sidewall thick inner surface 331 and a suction sidewall thick inner surface 333. In the exemplary embodiment, each support projection 329 is substantially cylindrical in shape and multiple support projections 329 are positioned throughout cooling channel 325 extending along airfoil length 218 (shown in FIG. 2). Trailing edge 222 defines a plurality of trailing edge cooling holes 341. In alternative embodiments, each support projection 329 has any other dimensional profile, for example size and/or shape, that enables cooling channel 325 to function as described herein.

In the exemplary embodiment, pressure sidewall 210 and suction sidewall 212 taper towards each other and thus are not parallel to one another. Pressure sidewall thick inner surface 331 extends from pressure sidewall 210 toward suction sidewall 212 for a thickness 335, reducing the cross-sectional flow area within cooling channel 325. Additionally, suction sidewall thick inner surface 333 extends from suction sidewall 212 toward pressure sidewall 210 for a thickness 337, further reducing the cross-sectional flow area within cooling channel 325. Both pressure sidewall thick inner surface 331 and suction sidewall thick inner surface 333 provide additional thickness 335 and 337 for pressure sidewall 210 and suction sidewall 212 to decrease the cross-sectional flow area within cooling channel 325 and increase the flow velocity through cooling channel 325. Increasing the flow velocity through cooling channel 325 also increases the heat transfer coefficient of trailing edge 222. As pressure sidewall thick inner surface 331 and suction sidewall thick inner surface 333 extend toward trailing edge 222, thicknesses 335 and 337 taper to maintain a smoothly varying cross-sectional flow area throughout channel 325 even with the tapering sidewalls 210 and 212.

During turbine engine 100 (shown in FIG. 1) operation, airfoil 206 is exposed to high temperatures combustion gases 118 (shown in FIGS. 1 and 2). To reduce corresponding thermal stresses and/or thermal degradation of airfoil 206, coolant fluid 236 is channeled through cooling passage 234 defined within airfoil 206 to provide a coolant stream therein. For example, coolant fluid 236 is channeled through cooling passage 234 and into impingement holes 324. Impingement holes 324 channel a stream of coolant fluid 326 into post-impingement zones 318, 320, and 322. In the exemplary embodiment, impingement holes 324 form jets of air striking first target impingement surface 238, second target impingement surface 240, and third target impingement surface 242 for impingement cooling, removing heat, and reducing the temperature of each sidewall 210 and 212 which are in contact with combustion gases 118. After contacting first target impingement surface 238, second target impingement surface 240, and third target impingement surface 242, a stream of coolant fluid 328 within leading edge impingement zone 322 is further channeled and/or directed through film holes 303 and out of airfoil 206. Within pressure side impingement zone 318 a stream of coolant fluid 330 is channeled in longitudinal direction 223 to either film holes 303 or to trailing edge cooling system 305. Coolant fluid 330 is channeled through cooling channel 325 and exhausted out trailing edge cooling holes 341. Within suction side impingement zone 320 a stream of coolant fluid 339 is channeled to film holes 303 in a bidirectional cross-flow pattern.

FIG. 4 is a sectional view of interior wall 308 as illustrated in FIG. 3. Interior wall 308 includes impingement holes 324. Each impingement hole 324 within interior wall 308 includes a centroid 406 and an impingement hole diameter 408. Impingement holes 324 within interior wall 308 include a varying impingement hole density pattern. The varying impingement hole density pattern may vary by radial direction 217 and longitudinal direction 223. To illustrate the varying impingement hole density pattern, impingement holes 324 depicted in FIG. 4 include a first impingement hole distance 410 and a second impingement hole distance 412. One measure of the density of impingement holes 324 within a localized region of interior wall 308 is impingement hole distance (410 and 412) divided by impingement hole diameter 408. As impingement hole distance (410 and 412) increases, the density of impingement holes 324 decreases. Conversely, as impingement hole distance (410 and 412) decreases, the density of impingement holes 324 increases. As depicted in FIG. 4, first impingement hole distance 410 is less than second impingement hole distance 412. Thus, as depicted in FIG. 4, the impingement hole density of interior wall 308 varies along longitudinal direction 223 and radial direction 217. Varying the impingement hole density of interior wall 308 along longitudinal direction 223 and radial direction 217 is shown for illustration purposes only. The variation of impingement hole density of interior wall 308 is not limited to variations along longitudinal direction 223 and radial direction 217 but may vary in any direction which enables airfoil impingement system 306 to operate as described herein.

The density of impingement holes 324 within localized regions of interior wall 308 is one of the primary parameters which determine the flow rate, velocity, pressure drop, Reynolds Number, and, ultimately, the heat transfer coefficient of coolant fluids 328, 330, and 339. That combination of parameters determines the ultimate heat transfer coefficient and heat transfer rate along first target impingement surface 238, second target impingement surface 240, and third target impingement surface 242.

Tuning the density of impingement holes 324 within localized regions of interior wall 308 along with compartmentalizing post-impingement space 312 into impingement zones 318, 320, and 322 facilitates tuning the flow rate, velocity, pressure drop, Reynolds Number, and, ultimately, affecting the heat transfer coefficient between coolant fluids 328, 330, and 339 and exterior wall 302. Tuning the heat transfer coefficient to local requirements allows impingement system 306 to maintain the airfoil at a consistent and uniform temperature which reduces thermal stresses and/or thermal degradation of airfoil 206.

Airfoil 206, including sidewalls 210 and 212, airfoil impingement system 306, and trailing edge 222, is fabricated via a casting process. For example, a ceramic core (not shown) is formed in the shape of airfoil impingement system 306 and trailing edge cooling system 305 such that a substrate of airfoil 206 may be cast around the ceramic core. The ceramic core is then removed leaving airfoil 206 with airfoil impingement system 306 and trailing edge cooling system 305 formed therein. Additionally or alternatively, airfoil 206 may be fabricated using any other suitable fabrication method that enables airfoil impingement system 306 and trailing edge cooling system 305 to function as described herein, for example by additive manufacturing or by post cast machining.

In the exemplary embodiment, airfoil impingement system 306 and trailing edge cooling system 305 are illustrated within airfoil 206 of stator vane 202, however, in alternative embodiments, airfoil impingement system 306 and trailing edge cooling system 305 is within a trailing edge that is included within blade airfoil 224 (shown in FIG. 2) and/or any other turbine engine component that includes an airfoil therein.

The above-described embodiments provide an efficient system for removing heat and cooling gas turbine components. Specifically, in the exemplary embodiment, the gas turbine component includes an airfoil that is provided with an impingement system defined within an airfoil body. The impingement system includes an interior wall defining an interior space. The interior wall and the exterior wall define a post-impingement space therebetween. A plurality of dividers extend from the interior wall to the exterior wall each of which compartmentalize the post-impingement space into a plurality of post-impingement zones. The interior wall further defines a plurality of impingement holes which channel a flow of coolant into the post-impingement zones. The post-impingement zones channel the flow of coolant along an inner surface of the exterior wall to remove heat from the exterior wall. During operation of the gas turbine engine, different regions of the airfoil body may by exposed to different temperatures and flows of a hot fluid depending on the arrangement of the airfoil body within the gas turbine engine. As such, different regions of the airfoil body may experience different exterior wall boundary conditions and have different, local requirements for removing heat from these disparate regions. Compartmentalizing the post-impingement space into post-impingement zones allows the flow rate and velocity of the flow of coolant to be independently tuned to the local heat removal requirements of the different regions of the airfoil body and maintaining a consistent and uniform temperature of the airfoil body.

An exemplary technical effect of the systems and methods described herein includes at least one of: (a) removing heat from a gas turbine engine component that includes an airfoil; (b) maintaining a consistent temperature with the airfoil to improve component efficiency; (c) reduce amount of coolant fluids extracted from a compressor; (d) increase the coolant stream efficiency with a component region that is traditionally difficult to cool; and (e) increase gas turbine engine efficiency.

Exemplary embodiments of systems and methods for removing heat from a gas turbine engine component are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the gas turbine engine stator vanes as described herein. Rather, the exemplary embodiment can be implemented and utilized in connection with many other gas turbine engine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil comprising:
  an exterior wall comprising an inner surface, an outer surface, and a plurality of exterior wall regions, said exterior wall defining a first interior space, said exterior wall further comprising:
    a pressure sidewall; and
    a suction sidewall coupled to said pressure sidewall, wherein said suction sidewall and said pressure sidewall define a leading edge and a trailing edge opposite said leading edge;
  a root portion;
  a tip portion opposite said root portion;
  a trailing edge pin bank disposed within said first interior space; and
  an impingement system disposed within said first interior space, said impingement system configured to channel a coolant stream to said exterior wall, said impingement system comprising:
    an interior wall substantially parallel to said exterior wall, said interior wall defining a second interior space, said interior wall further defines a plurality of impingement holes configured to channel a flow of coolant from said second interior space to said first interior space, said interior wall having an impingement hole density having a varying hole density pattern; and
    a plurality of dividing walls extending from said interior wall to said exterior wall, said interior wall, said exterior wall, and said plurality of dividing walls define a first zone and a second zone, said plurality of dividing walls comprises a first dividing wall coupled to said trailing edge pin bank, said first dividing wall separating said first zone and said second zone, wherein said impingement hole density is configured to separately meter flow to said first and second zones.

2. The airfoil in accordance with claim 1, wherein said exterior wall further defines a plurality of film holes configured to separately meter flow to said first and second zones by channeling the flow of coolant from said first interior space.

3. The airfoil in accordance with claim 2, wherein said first and second zones configured to channel said flow of coolant to said trailing edge pin bank, said flow of coolant within said trailing edge pin bank having a pressure drop, said pressure drop configured to separately meter flow to said first and second zones.

4. The airfoil in accordance with claim 3, wherein said interior wall, said exterior wall, and said plurality of dividing walls further define a third zone, said plurality of dividing walls comprises a second dividing wall and a third dividing wall, said second dividing wall separating said first zone from said third zone and said third dividing wall separating said second zone from said third zone, said first, second, and third zones having a compartmentalized arrangement, said compartmentalized arrangement configured to separately meter flow to said first, second, and third zones.

5. The airfoil in accordance with claim 3, wherein said plurality of impingement holes and said plurality of film holes are arranged to channel the flow of coolant within said first zone, said second zone, and said third zone in a bidirectional crossflow pattern.

6. The airfoil in accordance with claim 1, wherein said trailing edge pin bank comprises a plurality of projections coupled to said suction sidewall and said pressure sidewall adjacent said trailing edge, said plurality of projections extending from said pressure sidewall to said suction sidewall such that a trailing edge cooling channel is defined.

7. A system for removing heat from an airfoil, the airfoil including a trailing edge pin bank and an exterior wall including an inner surface, an outer surface, and a plurality of exterior wall regions, the exterior wall defining a first interior space, the exterior wall comprising a pressure sidewall, a suction sidewall coupled to the pressure sidewall, wherein the suction sidewall and the pressure sidewall define a leading edge and a trailing edge opposite the leading edge, the airfoil further including a root portion and a tip portion opposite the root portion, said system comprising:
  an impingement system disposed within the first interior space, said impingement system configured to channel a coolant stream to the exterior wall, said impingement system comprising:
    an interior wall substantially parallel to the exterior wall, said interior wall defining a second interior space, said interior wall further defines a plurality of impingement holes configured to channel a flow of coolant from said second interior space to the first interior space, said interior wall having an impingement hole density having a varying hole density pattern; and
    a plurality of dividing walls extending from said interior wall to said exterior wall, said interior wall, said exterior wall, and said plurality of dividing walls define a first zone and a second zone, said plurality of dividing walls comprises a first dividing wall coupled to said trailing edge pin bank, said first dividing wall separating said first zone and said second zone, wherein said impingement hole density is configured to separately meter flow to said first and second zones.

8. The system for removing heat from an airfoil in accordance with claim 7, wherein the exterior wall further defines a plurality of film holes configured to separately meter flow to said first and second zones by channeling the flow of coolant from said first interior space.

9. The system for removing heat from an airfoil in accordance with claim 8, wherein said first and second zones configured to channel said flow of coolant to said trailing edge pin bank, said flow of coolant within said trailing edge pin bank having a pressure drop, said pressure drop configured to separately meter flow to said first and second zones.

10. The system for removing heat from an airfoil in accordance with claim 9, wherein said interior wall, said exterior wall, and said plurality of dividing walls further define a third zone, said plurality of dividing walls comprises a second dividing wall and a third dividing wall, said second dividing wall separating said first zone from said third zone and said third dividing wall separating said second zone from said third zone, said first, second, and third zones having a compartmentalized arrangement, said compartmentalized arrangement configured to separately meter flow to said first, second, and third zones.

11. The system for removing heat from an airfoil in accordance with claim 10, wherein said plurality of impingement holes and said plurality of film holes are arranged to channel the flow of coolant within said first zone, said second zone, and said third zone in a bidirectional crossflow pattern.

12. A gas turbine system, said gas turbine system comprising:
  a compressor section;
  a combustion system coupled in flow communication with said compressor section; and
  a turbine section coupled in flow communication with said combustion system, wherein said turbine section comprises:
    an airfoil comprising:
      an exterior wall comprising an inner surface, an outer surface, and a plurality of exterior wall regions, said exterior wall defining a first interior space, said exterior wall further comprising:
        a pressure sidewall; and
        a suction sidewall coupled to said pressure sidewall, wherein said suction sidewall and said pressure sidewall define a leading edge and a trailing edge opposite said leading edge;
      a root portion;
      a tip portion opposite said root portion;
      a trailing edge pin bank disposed within said first interior space; and
      an impingement system disposed within said first interior space, said impingement system configured to channel a coolant stream to said exterior wall, said impingement system comprising:
        an interior wall substantially parallel to said exterior wall, said interior wall defining a second interior space, said interior wall further defines a plurality of impingement holes configured to channel a flow of coolant from said second interior space to said first interior space, said interior wall having an impingement hole density having a varying hole density pattern; and
        a plurality of dividing walls extending from said interior wall to said exterior wall, said interior wall, said exterior wall, and said plurality of dividing walls define a first zone and a second zone, said plurality of dividing walls comprises a first dividing wall coupled to said trailing edge pin bank, said first dividing wall separating said first zone and said second zone, wherein said impingement hole density is configured to separately meter flow to said first and second zones.

13. The gas turbine in accordance with claim 12, wherein said exterior wall further defines a plurality of film holes configured to separately meter flow to said first and second zones by channeling the flow of coolant from said first interior space.

14. The gas turbine in accordance with claim 13, wherein said first and second zones configured to channel said flow of coolant to said trailing edge pin bank, said flow of coolant within said trailing edge pin bank having a pressure drop, said pressure drop configured to separately meter flow to said first and second zones.

15. The gas turbine in accordance with claim 14, wherein said interior wall, said exterior wall, and said plurality of dividing walls further define a third zone, said plurality of dividing walls comprises a second dividing wall and a third dividing wall, said second dividing wall separating said first zone from said third zone and said third dividing wall separating said second zone from said third zone, said first, second, and third zones having a compartmentalized arrangement, said compartmentalized arrangement configured to separately meter flow to said first, second, and third zones.

16. The gas turbine in accordance with claim 15, wherein said plurality of impingement holes and said plurality of film holes are arranged to channel the flow of coolant within said first zone, said second zone, and said third zone in a bidirectional crossflow pattern.

17. The gas turbine in accordance with claim 12, wherein said trailing edge pin bank comprises a plurality of projections coupled to said suction sidewall and said pressure sidewall adjacent said trailing edge, said plurality of projections extending from said pressure sidewall to said suction sidewall such that a trailing edge cooling channel is defined.

* * * * *